Figure 6:
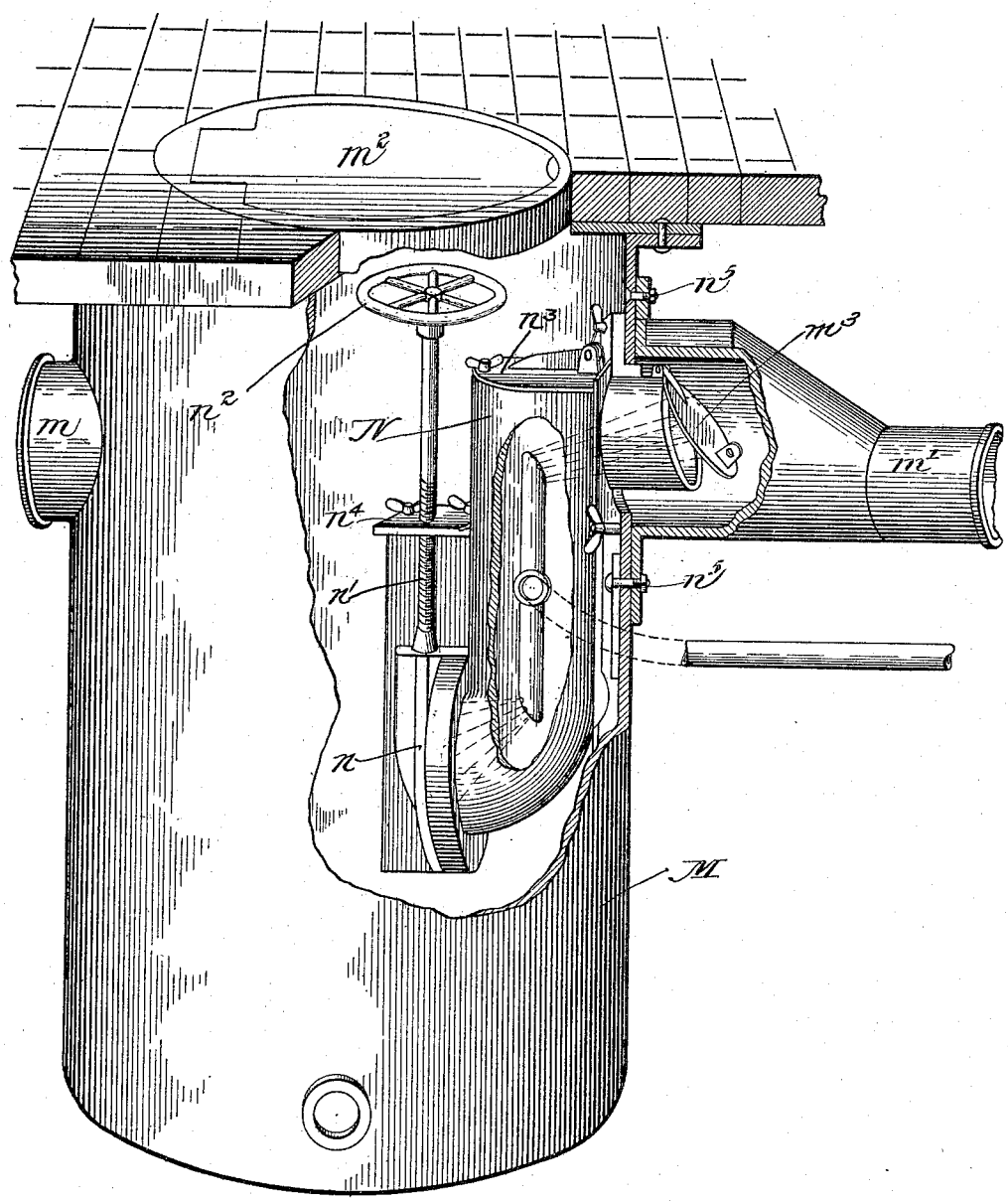

J. J. WADE.
COMBINATION MANHOLE AND GATE VALVE FOR SEWER CONNECTIONS.
APPLICATION FILED MAY 4, 1914.
1,186,627.
Patented June 13, 1916.
3 SHEETS—SHEET 1.
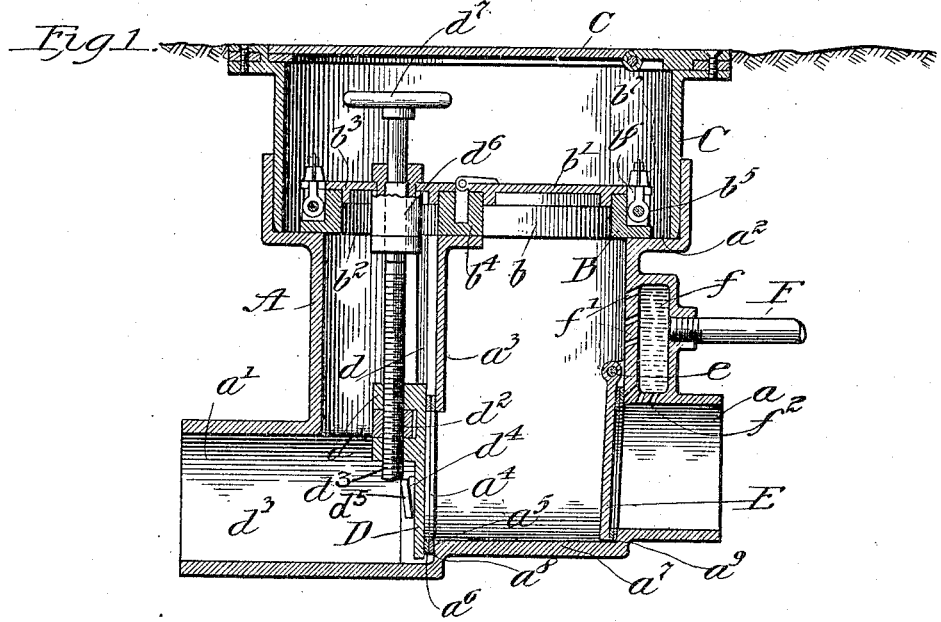
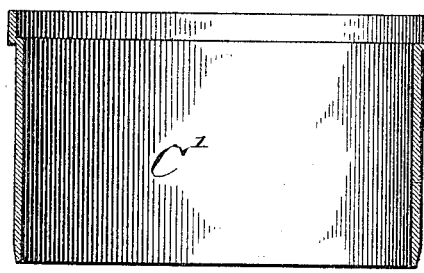
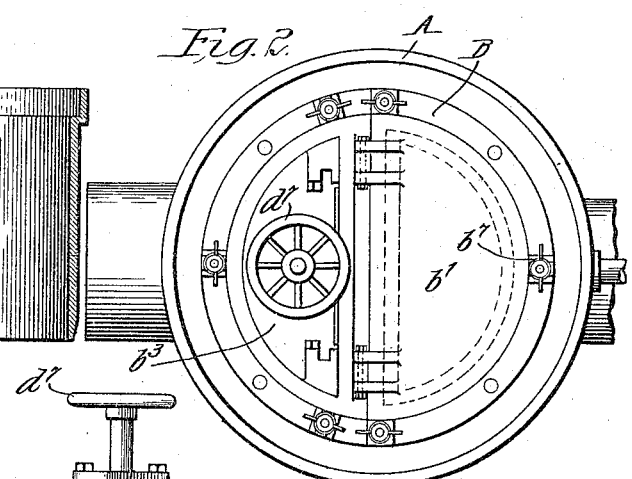
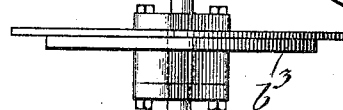
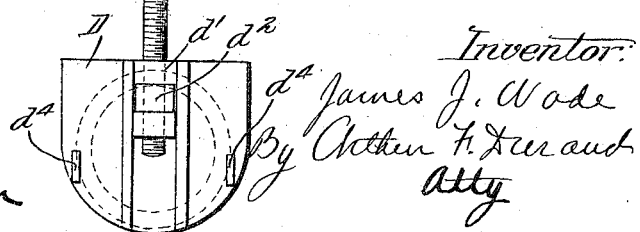

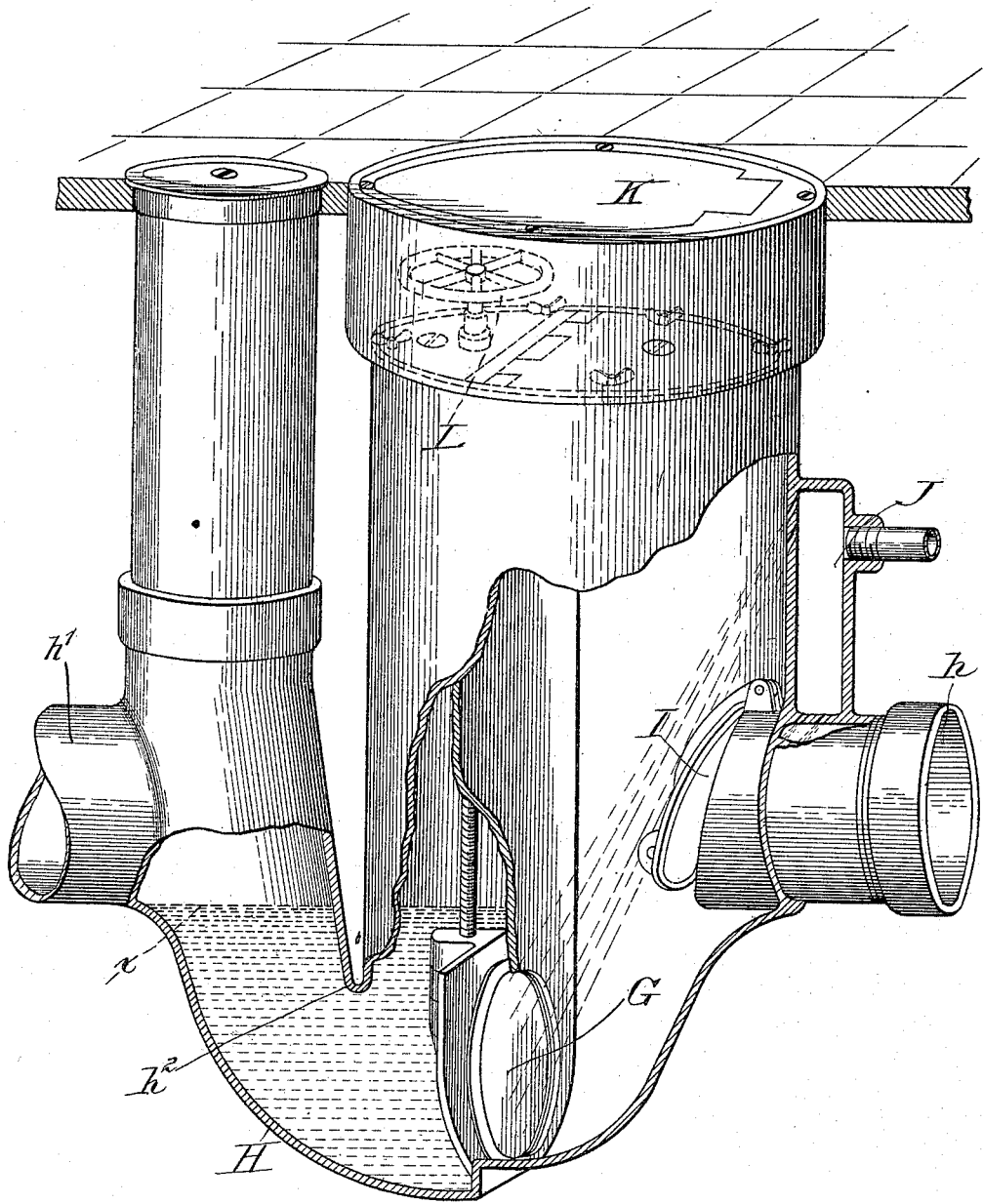

J. J. WADE.
COMBINATION MANHOLE AND GATE VALVE FOR SEWER CONNECTIONS.
APPLICATION FILED MAY 4, 1914.

Patented June 13, 1916.

UNITED STATES PATENT OFFICE.

JAMES J. WADE, OF CHICAGO, ILLINOIS.

COMBINATION MANHOLE AND GATE-VALVE FOR SEWER CONNECTIONS.

1,186,627.  Specification of Letters Patent.  Patented June 13, 1916.

Application filed May 4, 1914. Serial No. 836,079.

*To all whom it may concern:*

Be it known that I, JAMES J. WADE, a citizen of the United States of America, and resident of Chicago, Cook county, Illinois, have invented a certain new and useful Improvement in Combination Manholes and Gate-Valves for Sewer Connections, of which the following is a specification.

My invention relates to sewer connections and fittings, and more particularly to manhole cleanouts, catch basins and traps, as well as other fittings and devices of this general character, such as are ordinarily included in the connection between the house and the sewer.

Generally stated, the object of my invention is to provide novel and additional means for effectively preventing the contents of the sewer from backing up into the house, as is often liable to happen when a severe downpour of rain floods the sewer pipes, or if for any other reason the water in the sewer shows an inclination to flow back into the house, rather than in the opposite direction.

It is also an object to provide a combined manhole cleanout and gate valve which can be operated by hand to prevent the storm water from backing up and entering the house, which can be readily installed as a single or unitary fitting, and which can be readily opened and entered for the purpose of cleaning and repairing the interior thereof.

It is also an object to provide certain details and features of construction and combinations tending to increase the general efficiency of a combination fitting of this kind and render the same suitable for different purposes, whereby it may be used either as an ordinary manhole cleanout, or as a catch basin, or as a trap, or in combination with some other sewer fitting or connection of similar character.

To the foregoing and other useful ends my invention consists in matters hereinafter set forth and claimed.

In the accompanying drawings Figure 1 is a vertical section of a combined manhole cleanout, check valve and gate valve structure embodying the principles of my invention. Fig. 2 is a plan of the structure shown in Fig. 1 with the cover thereof removed. Fig. 3 is a detail view of the gate valve mechanism removed from the manhole. Fig. 4 is a sectional view showing a thimble or extension whereby the manhole may be placed farther below the floor line, or farther below the outer cover of the structure, if for any reason this should be necessary or desirable. Fig. 5 is a perspective of my invention as embodied in a floor trap. Fig. 6 is a perspective of a catch basin provided with a gate valve and manhole cleanout combination arrangement embodying the principles of my invention.

As thus illustrated, and referring to Figs. 1 to 4 inclusive my invention comprises a manhole cleanout fitting or body A having an inlet boss $a$ and an outlet boss $a^1$ disposed at opposite sides of the lower end thereof, it being observed that the outlet is preferably a little larger than and stepped a little below the inlet. In practice the inlet $a$ is connected with the house or building, and the outlet $a^1$ is connected with the main sewer. At its top the fitting or body A is provided with an enlargement forming a seat $a^2$ for the ring B, and also for the lower edge of the extension C, which latter is provided with a removable cover $c$ at the ground line or surface of the floor. The ring B has an opening $b$ provided with a hinged plate forming a cover $b^1$, and is also provided with an opening $b^2$ having a removable cover $b^3$, the two openings being separated by a central portion $b^4$ extending transversely of the ring. The fastening bolts $b^5$ are pivoted on the outside of the ring B, are adapted to engage the slots $b^6$ in the edge of the covers, and are provided with thumb nuts $b^7$ by which said covers are tightly held down in place. A vertical wall $a^3$ extends across the interior of the body A, below the cross piece $b^4$ of the ring, and between the inlet and outlet of the structure. This wall has an opening $a^4$ and on the outlet side of this opening there is a brass ring $a^5$ which engages a similar ring $a^6$ on the vertically reciprocating gate valve D, which latter moves up and down in guides $d$ formed in the opposite inner surfaces of the body. For this purpose the said gate valve is provided with a pair of lugs $d^1$ which hold a nut $d^2$ between them, the said nut engaging the threads of a vertically disposed screw $d^3$, whereby rotation of said screw causes said valve to move up or down. When the valve is down it is held tightly in place by wedges $d^4$ on the back thereof, said wedges engaging the beveled lugs $d^5$ on the inner sides of the body. The upper portion of the screw is swiveled in a bearing $d^6$ which is secured to the cover $b^3$, and which is lifted out of position with the cover when the latter is removed, whereby said cover and gate valve are removable as a unit. (See Fig. 3). The upper end of the screw is provided with a hand wheel $d^7$, and by rotating this wheel the gate valve D can be opened and closed.

The cover $b^1$ can be hinged to the ring portion $b^4$, or it can be hinged to the cover $b^3$, as may be found necessary or desirable. Necessarily, however, this hinged plate $b^1$ is in a plane above the gate valve and below the cover $c$ of the manhole. For this reason I do not limit myself to any particular construction of these covers. It will be seen, however, that in any event the hand wheel $d^7$ is inclosed in the chamber formed below the upper or outside cover $c$, and is accessible by simply raising this cover. The gate valve thus constructed may constitute the sole means for shutting off the back flow from the sewer, should occasion require, and can be arranged in any suitable manner within the manhole cleanout to form therewith a unitary structure or fitting. As a matter of further and special improvement, however, a pivoted check valve E can be arranged to hang in front of the inlet $a$, being pivoted at $e$ upon a portion disposed above said opening. Ordinarily, this pivoted valve will automatically close and shut out the back flow from the sewer; but should the passage at this point become clogged, the said valve might then refuse to close at the proper time, with the result that a sufficient opening would be maintained to permit the back flow from the sewer to pass into the house or building. In such case, the gate valve D can then be manually closed, thereby positively precluding any further trouble of this kind. A water pipe F connects with the chamber $f$ formed in the wall of the body, said wall having jet openings $f^1$ whereby small streams of water are caused to impinge upon the surface of the gate valve D, thereby cleaning the latter. Similar openings $f^2$ are disposed in position to cause streams of water to issue from the bottom of the chamber $f$ and impinge upon the surface of the check valve E, whereby provision is also made for cleaning this valve.

In Fig. 5 the construction is similar to that previously described, except that in this case the manually operable gate valve G is applied to a trap H, which latter has an inlet $h$ and an outlet $h^1$, these two openings being separated by a downwardly extending wall $h^2$ which forms the trap. In other words, this portion $h^2$ extends below the normal water line X, whereby a water seal is always present between the inlet and the outlet. The pivoted check valve I and flushing device J are similar to those previously described. This is also a combination fitting, being provided with a manhole cover K, at its upper end, like the one previously described. This cover affords access to the hand wheel L similar to the one previously described, for operating the gate valve.

In Fig. 6 a catch basin M is shown having an inlet $m$ and an outlet $m^1$ of any suitable character. The manhole cover $m^2$ may be like the one previously described. The interior of the catch basin is provided with a hollow casting N having its upper end provided with a pivoted check valve $m^3$, which latter communicates with the outlet $m^1$, whereby the passage will be closed automatically if the water in the sewer attempts to back up into the house. This check valve is in the form of a hinged plate which opens outward to allow the sewage to escape, but which closes to prevent back-pressure from reaching the cover of the manhole. The lower end of the hollow member or fitting N has a gate valve $n$, similar to the one previously described, and this gate valve is provided with a screw $n^1$ and a hand wheel $n^2$ for the operation thereof. The member or casting N is also provided with suitable covers $n^3$ and $n^4$ which can be removed to afford access downwardly to the interior of said member, and to permit the removal of the gate valve. Necessarily, the hinged plate $m^3$ is in a plane above the gate valve and below the cover $m^2$ of the manhole. The member N is fastened to the wall of the catch basin by means of fastening devices $n^5$ of any suitable character.

From the foregoing it will be seen that I provide a combined manhole cleanout and gate valve, and that the same may be combined in various ways, and for various purposes, depending upon the requirements of any particular case. The removal of the manhole cover, in each case, affords access not only to the interior of the cleanout, trap or catch basin, depending upon the character of the structure, but also to the gate valve. Thus, in each case, the different instrumentalities are combined in one unitary structure and in addition means are provided for manually shutting off the back flow from the sewer. With further respect to the use of a gate valve, or similar valve in a manhole cleanout of this general character, in any of the various forms shown and described, but more particularly with reference to that shown in Figs. 1 to 4 inclusive, it will be seen that the outlet $a^1$ is stepped down a short distance below the floor line $a^7$ of the body A, whereby a shoulder $a^8$ is provided below this line or bottom surface, for the valve. It will also be seen that a similar step down shoulder $a^9$ is provided for the pivoted valve E, whereby the inlet $a$ is slightly above the floor or bottom of the body. In this way, there is nothing in the bottom of the structure which can tend to impede the flow through the interior of the body, as there are no bottom ridges in front of the lower edges of the valves, and neither are there any slots at these points. In other words, there are no ridges which can impede the flow, and no slots to fill up, and consequently the structure is not liable to clog. The valve D or the valve G, or the valve $n$ is in each case removable upwardly and bodily with the screw mechanism through the manhole.

In any construction embodying my invention, as illustrated by the different drawings, the means for preventing back-pressure on the cover of the manhole is disposed in a plane above the valve and below the said cover, the said means being either in the form of the cover just below the hand wheel of the screw, or in the form of the valve $m^3$, thus serving to prevent back-pressure from reaching the cover $c$ at the top of the structure. Furthermore, it will be seen that the hand wheel of the said valve mechanism is disposed at a fixed depth underneath the manhole cover C, so that during the opening and closing of the valve this handle does not move up and down.

What I claim as my invention is:—

1. A combined manhole cleanout and gate valve in the form of a unitary drain fitting adapted for connection between the sewer and building, comprising a hollow body provided with inlet and outlet portions, said body having the upper portion thereof provided with a manhole cover affording access to the interior of said body, a normally open gate valve within said body to control communication between said inlet and outlet, a seat for said valve, screw mechanism to raise and lower said valve and hold it in adjusted position on said seat, a handle underneath said cover to manually operate said mechanism, said gate valve and mechanism and handle being removable upwardly from the top of said body by pulling upward on said handle when said cover is open, and means to prevent back-pressure from the sewer against the under side of said cover, said means consisting of a closure disposed a distance below said cover, forming with the latter a chamber for said handle, and said closure having a hinged section which affords access to said valve below.

2. A combined manhole cleanout and gate valve in the form of a unitary drain fitting adapted for connection between the sewer and building, comprising a hollow body provided with inlet and outlet portions, said body having the upper portion thereof provided with a manhole cover affording access to the interior of said body, a normally open gate valve within said body to control communication between said inlet and outlet, a seat for said valve, screw mechanism to raise and lower said valve and hold it in adjusted position on said seat, a handle disposed at a fixed depth underneath said cover to manually operate said mechanism, said gate valve and mechanism and handle being removable upwardly from the top of said body by pulling upward on said handle when said cover is open, and means including a hinged plate disposed in a plane above said valve and below said cover to prevent back-pressure from the sewer against the under side of said cover, said mechanism including a vertically disposed screw, said valve having a threaded portion to engage said screw, and said handle being a wheel fixed to the upper end of said screw.

Signed by me at Chicago, Illinois, this 15th day of April 1914.

JAMES J. WADE.

Witnesses:
ARTHUR F. DURAND,
RACHAEL J. RICHARDSON.